(No Model.)

J. A. McCLELLAND.
MOLD FOR VENEERING OR COVERING ARTICLES WITH PYROXYLINE OR OTHER PLASTIC MATERIAL.

No. 271,496. Patented Jan. 30, 1883.

Witnesses: Inventor.

N. PETERS, Photo-Lithographer, Washington, D. C.

UNITED STATES PATENT OFFICE.

JOHN A. McCLELLAND, OF LOUISVILLE, KENTUCKY.

MOLD FOR VENEERING OR COVERING ARTICLES WITH PYROXYLINE OR OTHER PLASTIC MATERIAL.

SPECIFICATION forming part of Letters Patent No. 271,496, dated January 30, 1883.

Application filed October 5, 1882. (No model.)

*To all whom it may concern:*

Be it known that I, JOHN A. McCLELLAND, of the city of Louisville, in the county of Jefferson and State of Kentucky, have invented a new and useful Improvement in Molds for Veneering or Covering Articles with Pyroxyline or other Plastic Material, of which the following is a specification.

My invention relates to molds to be employed in the process of veneering or covering articles with a substance of a plastic nature—such, for instance, as pyroxyline compound or xyloidine—by placing a pattern or body of the same shape but somewhat smaller than the finished article between two sheets of plastic veneering substance, and then surrounding or inclosing the whole by or in sand, putty, or other mobile or yielding material, and subjecting said yielding or mobile material to pressure to cause the sheets of plastic substance to conform exactly to the shape of the pattern or body used.

My present invention consists in a mold for molding plastic materials and veneering the same onto a pattern or body which gives the form, comprising two or more rigid sections and an intermediate mobile or yielding material capable of conforming to and pressing the plastic material upon or around the pattern or body in the operation of molding and veneering.

The invention also consists in the combination, with the mold composed of two or more rigid sections and intermediate mobile or yielding material, of a concentrating-frame, which preferably has one or both of its edges beveled from the inside outward, and which is adapted to fit easily in the sections of the mold and to be pressed down or around the sand, putty, or other mobile or yielding material when pressure is applied to said mold. As the concentrating-frame is forced into or around the sand, putty, or other mobile or yielding material it tends to force said material inward laterally and to compact it firmly around the article, and to thereby cause the intimate contact of the plastic veneering substance with the ends and sides of the article, as well as with the upper and lower surfaces.

Figure 5:
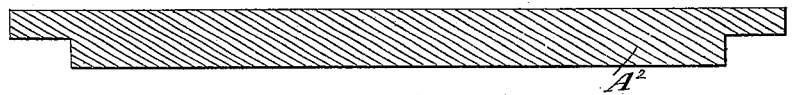
Figure 4:
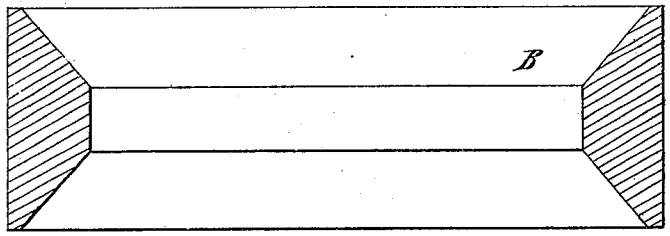
Figure 3:
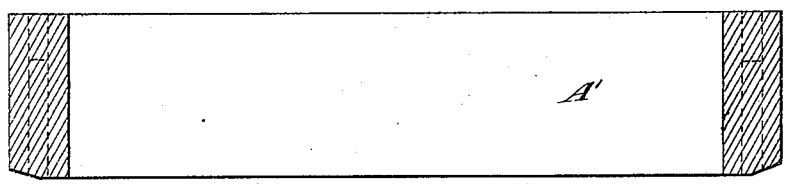
Figure 2:
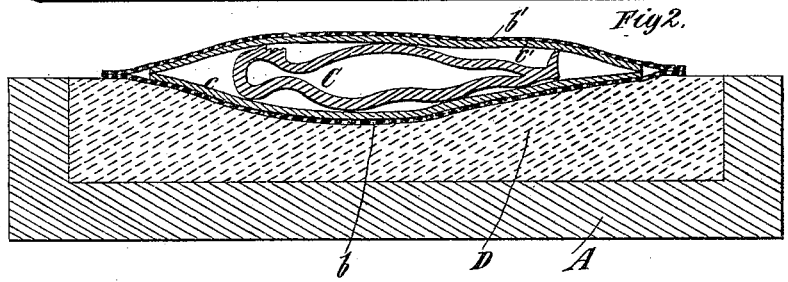
Figure 1:
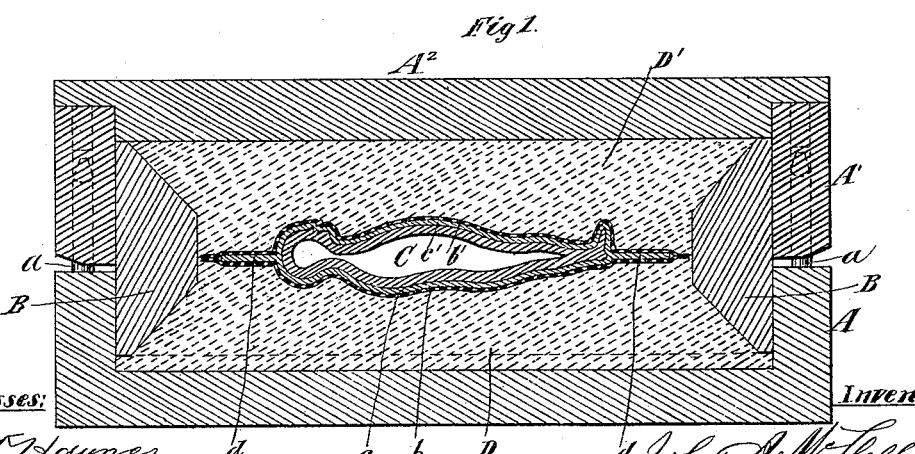

In the accompanying drawings, Figure 1 represents a vertical section of a complete mold constructed according to my invention, and having in it a covered or veneered article, illustrating the condition of the parts after the completion of the veneering process. Fig. 2 is a vertical section of the lower section of the mold containing the article to be veneered, and having the veneering material placed ready to be subjected to pressure. Fig. 3 is a vertical section of the upper section of the mold without its top. Fig. 4 is a vertical section of the concentrating-frame. Fig. 5 is a vertical section of the removable top of the upper part of the mold.

Similar letters of reference designate corresponding parts in all the figures.

A A' designate the lower and upper rigid parts or sections of the mold, which really constitute a box or flask, the upper part or section, A', in the present example of my invention having its cover or cap, $A^2$, made removable. The cover or cap may, however, be fixed to said upper part, A'. The proper relative position of the two parts of the box or flask is preserved by the ordinary steady-pins, $a$.

B designates a concentrating-frame, which is adapted to fit easily in two parts, A A', of the box or flask, and the edges of which are here shown as beveled from the interior outward, both upward and downward.

C designates a pattern or body of the article (in this instance a doll) which it is desired to veneer or cover, and which is the same shape as the finished doll, but somewhat smaller.

In carrying out the process, I first fill the part A of the box with putty, sand, or other material, D, which is mobile or yielding, and which is then leveled off. I then lay on the sand a piece, $b$, of paper, foil, or cloth, and over that a sheet of the pyroxyline or other substance of a plastic nature, to be used as a veneer. I then lay in the pattern or body C on the said sheet $c$ and press it down slightly, as shown in Fig. 2. I then lay over the pattern or body C another sheet, $c'$, of the pyroxyline or other plastic veneering substance, and a second sheet, $b'$, of paper, foil, or cloth. If the top $A^2$ is removable from the part A' of the box or flask, I then place the part A' on the part A, with the top removed, and fill in the part A' with sand, putty, or other material, D', of a yielding or mobile nature. I then place the concentrating-frame B within the part A', and place on the said frame the top $A^2$, after which the box or flask is subjected to pressure. As the pressure is applied the top $A^2$ presses down the concentrating-frame B and compacts the yielding or mobile material closely around the core C, thereby pressing the sheets $c\ c'$ of pyroxyline or other plastic or veneering substance into all the cavities of the core. An intimate contact of the veneer or covering with the core at all parts of its surface is thus produced, and the two sheets of veneer are made to adhere together all around the article, forming a fin, $d$, which may or may not be trimmed off.

If the top $A^2$ is fixed rigidly to the part $A'$ of the box or flask, I place the concentrating-frame on the sand or other yielding or mobile material in the lower part, A, after the latter has been filled, and then fill the said frame with sand to its upper edge, after which the upper part, $A'$, of the box or flask is placed over the said frame and pressure is applied.

Instead of making the concentrating-frame detachable from the box or flask, it may be fixed in one or the other of the parts of the box or flask. If the sheets $b\ b'$ are of cloth, the veneered or covered article will have a slightly-roughened appearance, due to the imprint of the cloth upon it. If the exterior of the article is to be polished, this roughness is of no consequence; but if it is desired to give it a smooth finish at once, paper, foil, or other material having a perfectly-smooth surface may be substituted for the cloth.

It will be seen that by the use of the concentrating-frame I cause the sand, putty, or other mobile or yielding material to be pressed inward against the sides and ends of an article, and thus press the veneering or covering into intimate contact therewith at all points.

If desirable, the box or flask, with its concentrating-frame, may be used for veneering or covering the end or part of an article, and in case this is desired I provide an opening or openings in the side of the said frame, through which the article may be inserted, part of the article projecting outside the frame. In this way the heads of canes, the handles of umbrella or parasol sticks, the handles of knives, and other articles may have a veneer or covering applied to them.

In case putty is used in the box, flask, or mold as the yielding or mobile material for transmitting pressure to the plastic veneering substance, it may be made with a non-siccative oil, so that it may be kept moist for a long time and be repeatedly used.

What I claim as my invention, and desire to secure by Letters Patent, is—

1. A mold for molding plastic materials and veneering the same onto a pattern or body which gives the form, comprising two or more rigid sections and an intermediate mobile or yielding material capable of conforming to and pressing the plastic material upon or around the pattern or body in the operation of molding and veneering, substantially as described.

2. The combination, with the two or more rigid sections of the mold and the mobile or yielding material contained therein, of the concentrating-frame fitting within said sections, substantially as and for the purpose described.

J. A. McCLELLAND.

Witnesses:
CHARLES W. WHITE,
M. S. THOMPSON.